Figure 1:
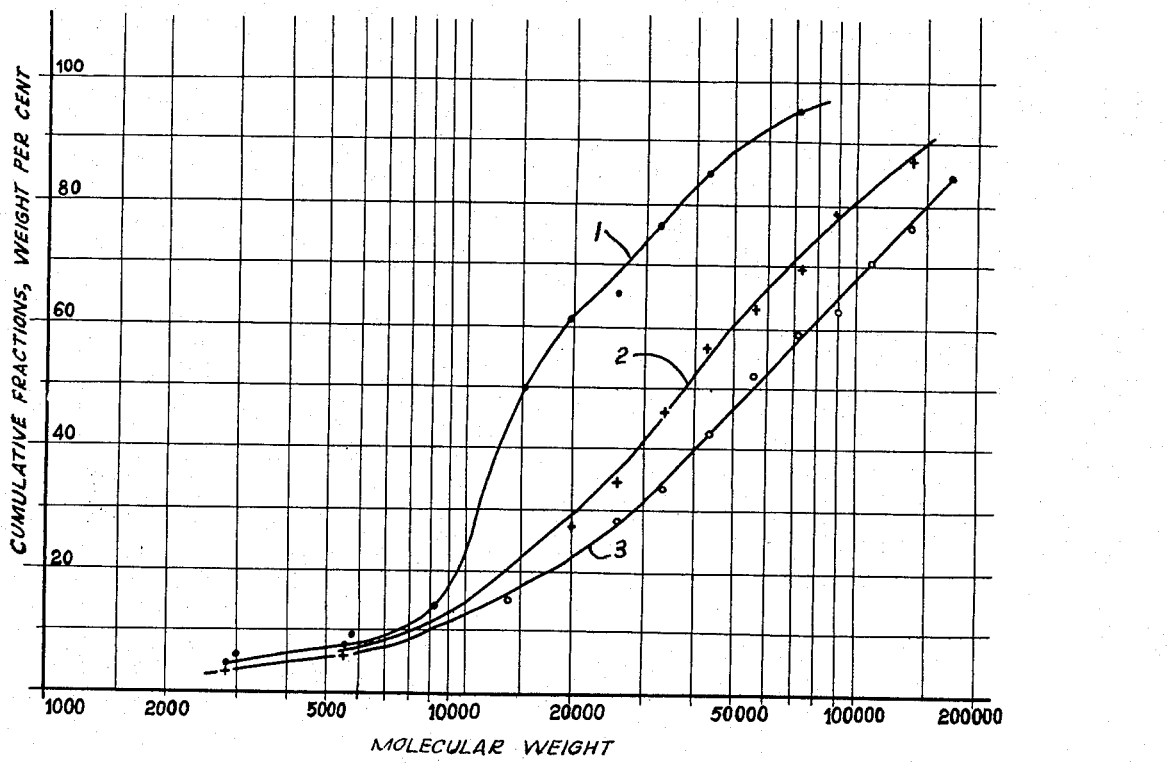

United States Patent Office 3,132,125
Patented May 5, 1964

3,132,125
PROCESS FOR POLYMERIZING OLEFINES UTILIZING A NON-POROUS SILICA SUPPORT
Jacques Schwander, Brussels, and Roger Dechenne, Strombeek-Brussels, Belgium, assignors to Solvay & Cie, Brussels, Belgium, a Belgian company
Filed Sept. 19, 1960, Ser. No. 56,921
Claims priority, application Netherlands Sept. 22, 1959
11 Claims. (Cl. 260—88.2)

This invention relates to a process of polymerizing olefines in the presence of a catalyst which is an oxygenated compound of chromium associated with a support.

It is known to carry out the polymerization of olefines by contacting them with a catalyst which is an oxygenated chromium compound with at least one oxide selected from the group consisting of silica, alumina, zirconia and thoria, at least part of the chromium being in the hexavalent state at the beginning of the reaction. As chromium oxygen compound it is proposed (British Patent No. 790,196) to use chromium oxide or a compound capable of being decomposed into chromium oxide by calcination or a stable chromate such as a chromate of an alkali metal (British Patent No. 831,994).

The porous support is preferably constituted by a silica-alumina gel having a specific surface of at least 450 square metres per gram and of which the mean diameter of the pores is at least 65 A. (Belgian Patent No. 562,448).

In order to increase their reactivity, these catalysts are activated by heating them at a temperature comprised between 232 and 816° C., in a dry atmosphere for a time sufficient for their acquiring an appreciable polymerizing activity.

The polymerization of olefines by means of these catalysts can be carried out in the presence or absence of a solvent. According to the operating conditions, the polymer is dissolved (solution process) or is suspended in the reaction medium (suspension process). In the absence of solvent the polymerization takes place in the gaseous phase.

The polymerization of ethylene according to the suspension process in the presence of a silica alumina support impregnated with chromium oxide generally yields polyethylene of which the average molecular weight is above 90,000. The application of such polymers proves difficult. It is known that in operation in the presence of chromates the average molecular weight is still more elevated.

The average molecular weight can be lowered by increasing the temperature at which the polymerization is carried out. However, in the case of the suspension process the temperature is practically limited to about 105° C. because at higher temperatures the polymer formed becomes partially soluble in the usual diluents and agglomerates in the course of the reaction.

It is also known that the molecular weight can be decreased by raising the activation temperature of the catalyst. It has been found, however, that the activation temperature is limited in the region of 850° C. for known catalysts. Heating at higher temperatures yields such a loss of reactivity that the catalysts thus treated become unsuitable for initiating and propagating the polymerization.

It is an object of this invention to provide a process for obtaining polyolefines having relatively low average molecular weight, while avoiding the above mentioned disadvantages.

Another object resides in a process for obtaining polyolefines having an appreciably modified molecular weight distribution.

This invention likewise concerns a process for obtaining polyolefines the molecular weight and granulometry of which vary as a function of the method of preparation of the catalyst.

The process consists in carrying out the polymerization of olefines in the presence of a catalyst which is a chromium oxygen compound, part of the chromium being in the hexavalent state, associated with a non-porous silica of very fine grain.

FIGURE 1 of the drawings is a particle-size distribution curve for each of three catalysts and illustrates advantages of catalysts of this invention.

Figure 2:
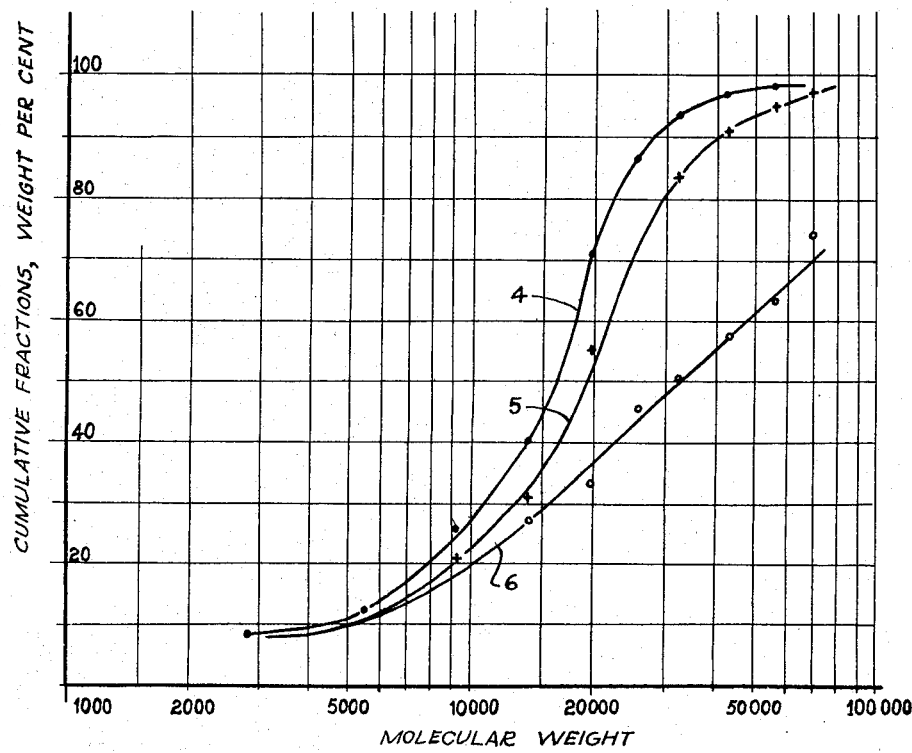

FIGURE 2 is the same type of curve shown in FIGURE 1 illustrating advantages of other catalysts of this invention.

Such catalyst supports give rise to activation at a temperature of the order of 1000° C. and even higher.

The non-porous silicas used are composed of grains having a mean diameter of about 150 A. and a specific surface less than 450 m.²/gr.

The best results have been obtained with silicas composed of grains having a mean diameter of 150 A. and a specific surface comprised between 150 and 200 m.²/gr. This surface corresponds to the external surface of spherical grains of the given diameter and indicates an almost total absence of porosity.

The silicas used have been prepared either by precipitation such as that sold under the commercial name Hi-Sil 233, or from silicon tetrachloride by hydrolysis at very high temperature such as the silicas Aerosil and Cab-O-Sil. The latter are preferred to the silicas prepared by precipitation since they yield a catalyst of much greater reactivity.

The catalysts containing as essential components non-porous silica and oxygen-chromium compounds can be activated at a temperature between 250 and 1200° C. This activation is preferentially obtained between 500 and 1050° C.

Various experiments on polymerization of ethylene according to the "suspension" process in n-pentane, carried out under the same conditions in the presence of chromium oxide associated with non-porous silicas, have demonstrated that for identical activation temperatures the average molecular weights are clearly lower than those obtained in the presence of prior catalysts.

The results of these experiments are reproduced in Table I hereafter:

TABLE I

| Type of support associated with chromium oxide | Activation temperature, °C | Reaction rate, gm. polymer/gm. cat./hour | Molecular weight* |
|---|---|---|---|
| Silica (87)-Alumina (13) (Davison MS 966 B). | 510 | About 800–1,000 | 130,000 |
| | 730 | About 800–1,000 | 90,000 |
| | 850 | 0 | |
| | 1,000 | 0 | |
| Precipitated nonporous silica (Hi-Sil 233). | 730 | 350 | 60,000 |
| | 850 | 350 | 56,000 |
| Non-porous silica hydrolyzed at high temperature (Aerosil). | 510 | 500 | 120,000 |
| | 730 | 1,500 | 80,000 |
| | 850 | 1,350 | 60,000 |
| | 1,000 | 1,450 | 56,000 |

*The molecular weights cited in the patent specification have been determined by the method of Dienes and Klemm (J of Appl. Phys., 1946, 17, June, p. 458).

It will be noticed that the non-porous silicas of the same type as those which are prepared by hydrolysis at high temperature of silicon tetrachloride in the presence of oxygen and hydrogen show an exceptional reactivity. Furthermore, the activation of the catalyst at a temperature above 816° C. does not reduce the reactivity which remains at 1450 gr. of polymer per gr. of catalyst per hour. An activation temperature of 1000° C. allows the reduction of the average molecular weight of the polyethylene to 56,000.

It is not possible to say at present what factor brings about this lowering of the average molecular weight of the polymer. Perhaps it is a matter of a transfer reaction which provokes premature termination of the hydrocarbon chains.

Table II hereafter gives the results of experiments on the production of polyethylene and copolymers of ethylene-butene-1 by the "solution" process in the presence of various catalysts and carried out under the same conditions.

It will be noticed that the properties of catalysts based on non-porous silica of fine grain influence the molecular weight as much as in the case of suspension polymerization.

TABLE II

Ethylene

| Type of support associated with chromium oxide | Activation temperature, °C | Reaction rate, gm. polymer/ gm. cat./ hour | Molecular weight |
|---|---|---|---|
| Silica (87)-Alumina (13) (Davison MS 966 B). | 600 | 1,140 | 41,500 |
|  | 1,000 | 0 | |
| Precipitated nonporous silica (Hi-Sil 233) | 600 | 130 | 34,000 |
| Non-porous silica hydrolyzed at high temperature (Aerosil) | 1,000 | 770 | 22,000 |

Copolymer of ethylene-butene-1

| Silica (87)-Alumina (13) (Davison MS 966 B). | 600 | 1,790 | 31,500 |
|---|---|---|---|
|  | 1,000 | 0 | |
| Precipitated nonporous silica (Hi-Sil 233) | 600 | 38 | 28,000 |
| Non-porous silica hydrolyzed at high temperature (Aerosil) | 1,000 | 700 | 19,500 |

The catalyst may be prepared by one of the different known methods, for example by impregnating fine grain non-porous silica with the aid of a chromium oxide solution, of a compound capable of being transformed to chromium oxide by calcination or a chromate which does not decompose at the temperature of activation. The impregnated silica is then dried and activated at a temperature comprised between 250 and 1200° C., preferably between 500 and 1050° C. for a time sufficient to yield the desired polymerizing activity.

The applicants have, however, discovered that the method of preparation of the catalyst has great importance and influences at the same time the polymerization reaction and the properties of the polymers thus formed.

If a catalyst of the above mentioned type is prepared by mixing the constituents in the solid state, that is to say, dry or in the presence of a small quantity of an organic diluent such as cyclohexane, it is found that the polymers and copolymers prepared with the aid of this catalyst possess a lower average molecular weight than that obtained in the presence of an identical catalyst prepared in the wet way, that is to say by impregnating the silica support with the aid of a solution of an oxygen chromium compound.

Various experiments of polymerizing and copolymerizing ethylene have been carried out under the same conditions according to the solution process in the presence of catalysts prepared in the dry way by mixing silica and the chromium salt in the solid state in the presence of a little cyclohexane, and in the wet way by impregnating the silica with a chromium salt solution. The results of these experiments set out in Table III below, show that for identical activation temperatures the average molecular weights obtained with the aid of catalysts prepared by mixing in the solid state are distinctly lower than those obtained in the presence of catalysts prepared by impregnation. The chromium salt used is $(NH_4)_2CrO_4$ and the support is a fine grain non-porous silica of the Aerosil type prepared by hydrolysis of silicontetrachloride at very high temperature.

TABLE III

Ethylene homopolymer

| Preparation of the catalyst | Temperature of activation, °C. | Reaction rate, gm./ polymer/ gm. cat./ hour | Molecular weight |
|---|---|---|---|
| By impregnation | 600 | 130 | 34,000 |
| By dry mixing | 600 | 140 | 24,000 |
| By impregnation | 1,000 | 770 | 22,000 |
| By dry mixing | 1,000 | 300 | 16,000 |

Copolymer of ethylene-buytene-1

| By impregnation | 600 | 40 | 28,000 |
|---|---|---|---|
| By dry mixing | 600 | 70 | 20,000 |
| By impregnation | 1,000 | 700 | 19,500 |
| By dry mixing | 1,000 | 420 | <10,000 |

In the case of the preparation of a catalyst in the wet way, that is to say by impregnation of the support with the aid of a solution of an oxygen chromium compound, certain difficulties are encountered: the small specific weight of the silica as well as the fineness of the silica particles makes it necessary to handle large volumes of material which, in the presence of the oxygen chromium compound solution, give thixotropic suspensions which it is very difficult to filter.

These difficulties may be avoided by mixing with the silica an amount of water sufficient to form a thick paste. This paste is then granulated. The granules obtained can, after drying, be easily handled and impregnated with the chromium oxygen compound solution. The catalyst thus formed is dried, ground and activated at the desired temperature.

The applicants have found that the granulometry of the catalyst thus prepared strongly influences the rate of reaction of the polymerization and in the case of the "suspension" process the granulometry of the polymer obtained.

Various experiments of polymerizing ethylene according to the suspension process have been caried out under the same conditions in the presence of a catalyst constituted by a silica of the Aerosil type impregnated with a solution of chromic anhydride and activated at 1000° C. In each experiment the catalyst was present in the form of a different granulometric fraction, the finest being less than 44 microns and the coarsest being classified between 1410 and 2000 microns. The results of these experiments are set out in Table IV below.

TABLE IV

| Granulometry of the catalyst, microns | Reaction rate, gm. polymer/gm. cat./hour | Mean granulometry of the polymer obtained, mm. |
|---|---|---|
| Below 44 | 392 | 0.2 |
| Below 125 | 775 | 0.6 |
| 177-250 | 1,150 | 1.4 |
| 350-500 | 1,375 | 1.7 |
| 1,410-2,000 | 1,635 | |

It will be noticed that the reaction rate is the greater as the grain size of the catalyst becomes higher which could not have been foreseen in any case. It has been further found that the different granular fractions possess the same specific surface, determined by the adsorption isotherm of nitrogen and that this surface is equal to the surface of a silica of this type when it has not been agglomerated. This appears to prove that the granulation of the support makes it more compact but does not destroy the individuality of each small grain of silica. It will be noticed, likewise, that the grain size of the polyethylene manufactured is the greater as the catalyst particles are themselves. In this way, it is possible to produce a polymer of any desired grain size by judiciously selecting the grain size of the catalyst.

During the manufacture of copolymers of ethylene butene-1 in the presence of a catalyst which is a support impregnated with a metallic compound, only a part of the butene-1 is incorporated and the other part may be recycled. The fraction of the monomer which is not incorporated undergoes in contact with the catalyst an isomerization to a greater or lesser extent which transforms part of the butene-1 into butene-2. It is known that the isomerization of 1-olefines into 2-olefines is catalysed by acid compounds while a neutral or alkaline reaction medium strongly reduces this isomerization. In general the oxides used as catalyst support encourage the isomerization and it is known to add to the support an alkaline compound such as caustic soda in order to reduce the transformation of butene-1 into butene-2. Silicas are in general classed among acid compounds which favour isomerization. The applicants have found that the non-porous silicas of fine grain used as catalyst supports only provoke a very slight isomerization of 1-olefines into 2-olefines. Table V below shows that the isomerization of butene-1 is about 20 times less than in the presence of a catalyst support which is a gel of silica or alumina.

TABLE V

| Type of support associated with chromium oxide | Reaction rate gm. copol/gm. cat./hour | Isomerization rate* of non-incorporated butene, percent |
| --- | --- | --- |
| Silica (87)-Alumina (13) (Davison MS 966 B) | 1,040 | 10 |
| Non-porous silica (Aerosil) | 350 | 0.5 |

*Isomerization rate in percent = $\frac{\text{Butene-2 (cis and trans)}}{\text{Butene-1 and 2}} \times 100$ The polymerization of olefines according to the process which is the object of the invention may be carried out in the presence of a composite catalyst consisting of a mixture of an oxygen chromium compound associated with a fine grain non-porous silica and a known catalyst, for example chromium oxide associated with at least one of the oxides of the group formed by porous silica, alumina, zirconia, thoria and titanium dioxide.

According to a particularly advantageous variant each component of the mixture is separately prepared and activated. They are not combined until the moment of introducing them into the polymerization autoclaves or better still, in the midst of the autoclave.

The polymer produced in the presence of such a composite catalyst is formed of macromolecules and developed under the catalytic action of one or the other of the components of the mixture. The proportions of this mixture taking into account the reactivity of each of the constituents, therefore influences the respective quantities of molecules of the various sizes, that is to say the distribution curve of molecular weights of the polymer.

Judicious choice of the proportions of the catalyst mixture used in the course of the process according to the invention thus permits the manufacture of polymers and copolymers of which constituent molecular weights are distributed according to a predetermined curve.

The accompanying FIGURES 1 and 2 show the distribution curves of molecular weights of polyethylenes manufactured in the presence of a catalyst mixture. By way of comparison curves are reproduced on the same graphs corresponding to polyethylenes made in the presence of each of the components of the mixture, taken separately.

The process of polymerization according to the invention is applicable to olefines and to conjugated diolefines and more particularly to ethylene, propylene, butene-1, pentene-1, hexene-1 and butadiene. The process likewise permits the production of copolymers of olefines and conjugated diolefines, for example copolymers of ethylene and propylene, ethylene and butene-1 and of ethylene butene-1 and butadiene.

The intention and object of the invention will be better understood by reference to the following examples, which are not to be considered as having a limiting character.

*Example 1*

By way of comparison with the process according to the invention and for better disclosure of the advantages, a series of experiments have been done on polymerization in the presence of a known catalyst activated at various temperatures. The catalyst is prepared by impregnating with the aid of a solution of chromic anhydride or of ammonium chromate, a silica-alumina support containing per kilogram, 870 g. of silica and 130 g. of alumina. The catalyst contains in the dry state 45 g. of $CrO_3$ per kg. of support. It is activated by heating in a current of dry air for 5–10 hours at a temperature of between 450 and 850° C.

(a) *Catalyst activated at 540° C.*—Into a 1.5 litre stainless steel autoclave, perfectly clean and dry, purged carefully with nitrogen, there are introduced 700 ml. of n-pentane (438 gr.) and 0.054 g. of activated catalyst over 10 hours at 540° C. The nitrogen atmosphere of the autoclave is replaced by pentane vapour by boiling the latter at 37° C. and allowing the nitrogen to escape through a gas washer containing cyclohexane. When all the nitrogen is eliminated the valve connecting the autoclave with the gas washer is closed and the temperature of the reactor is raised to 100° C. under strong agitation. The effective pressure of the pentane is then 5 kg. per square cm. Ethylene is introduced up to a total effective pressure in the autoclave of 32 kg. per sq. cm. and the ethylene is allowed to polymerize at this pressure which is maintained constant by continuous introduction of monomer. After 4 hours a suspension of polyethylene in n-pentane is withdrawn from the autoclave; after filtering and drying one obtains 375 g. of a polymer the average molecular weight of which is 120,000. The rate of polymerization is 1740 g. of polyethylene per g. of catalyst per hour.

(b) *Catalyst activated at 840° C.*—In the same autoclave containing the same quantity of pentane 0.153 g. of the same catalyst activated during 10 hours at 840° C. are introduced.

The polymerization carried out exactly as in the preceding experiments leads in 4 hours to the formation of 318 g. of polymer the average molecular weight of which is 83,000. The reaction rate is 520 g. of polyethylene per g. of catalyst per hour.

(c) *Catalyst activated at 1000° C.*—Under the same conditions as in the preceding experiments, polymerization of ethylene is attempted with 1 g. of catalyst (which is 7 times more than in the preceding example) activated at 1000° C. during 10 hours. At the end of 4 hours of reaction, only a negligible quantity of polyethylene is recovered.

*Example 2*

5 g. of a non-porous Aerosil silica of which the specific surface is 200 sq. metres per g. and of which the grains have a mean diameter of 150 A. are introduced into a beaker of 250 ml. 40 ml. of a solution of chromic anhydride containing 0.145 mole of $CrO_3$ per litre are added. The suspension is stirred for ½ hour and then filtered. The product is dried and placed in a rotary drier for 24 hours at 100° C. The catalyst then contains 48 g. of $CrO_3$ per kg. of dry support. It is activated in the same way as in Example 1 for about 10 hours at 1000° C. Under conditions similar to those in the preceding example 0.046 g. of catalyst are placed in the autoclave. The polymerization which takes place at 100° C. and at an effective pressure of 32 kg. per sq. cm. leads at the end of 4 hours to 266 g. of polyethylene the molecular weight of which is 56,000. The rate of polymerization is 1450 g. of polymer per g. of catalyst per hour.

*Example 3*

PREPARATION OF CATALYST BY GRANULATING, IMPREGNATING AND CRUSHING 100 g. of non-porous silica of the Aerosil type are mixed with 200–250 ml. of distilled water so as to form a thick paste. This paste is passed into a cold granulator which transforms it into granules of 4 mm. diameter and 4–6 mm. in length. The granules are then spread out on a hot plate and dried at 110° C. to constant weight. A certian quantity of granules is placed in a cylindrical basket of wire gauze with openings 1–2 mm. in size. The basket is plunged into a vessel of the same shape containing a solution of chromic anhydride with a concentration calculated according to the chromium content desired in the catalyst. After 10 minutes the basket is removed and allowed to drain for 30 minutes. The granules are then dried at 110° C. in a rotary drum to constant weight. The granules are then ground and sifted. Various granulometric fractions of this catalyst have been used after activation for the polymerization of ethylene and have led to the results given in Table IV.

*Example 4*

By way of reference two experiments were carried out on polymerization in solution in the presence of a known catalyst activated at two different temperatures. The catalyst is prepared by impregnating with a solution of 58 g. $CrO_3$ per litre a silica-alumina support identical with that described in Example 1. After drying, the catalyst is activated by heating in the fluidized state in a current of dry air.

(a) *Catalyst activated at 600° C.*—After activation for 15 hours at 600° C., 0.13 g. of catalyst are introduced together with 460 g. of cyclohexane into a 1.5 litre autoclave equipped with a stirrer. Energetic stirring maintains the catalyst suspended in the solvent. The temperature of the reactor is raised up to 135° C. and ethylene is introduced first at a rate of 500 g. per hour and subsequently at a rate sufficient to keep an effective pressure of 31.5 kg. per sq. cm. The temperature of the autoclave is maintained at 135° C. The experiment lasts two hours. Polymerization is stopped by allowing the ethylene to escape as well as part of the cyclohexane, by slightly opening the reactor. The polymer is recovered and dried in an oven under vacuum to constant weight. The yield is 295 g. of solid polymer of average molecular weight of 41,500 corresponding to a "melt index" of 1.0 and a specific weight of 0.96.

(b) *Catalyst activated at 1000° C.*—Under conditions identical to those described above, polymerization of ethylene is attempted in the presence of the same activated catalyst for 10 hours at 1000° C. At the end of two hours of reaction only a negligible quantity of polyethylene is recovered.

*Example 5*

5 g. of a non-porous silica Hi-Sil 233 of specific surface 150 sq. m. per g. and the mean grain diameter of which is 150 A. are introduced into a 250 ml. beaker. The silica is impregnated with a solution containing 19.8 g. of $CrO_3$ per litre strained and dried. The catalyst obtained then contains 44 g. of $CrO_3$ per kg. It is activated in the same way as in Example 4, for 15 hours at 600° C. 0.14 g. of it is introduced into the autoclave, together with 460 g. of cyclohexane. The polymerization is carried out exactly as in the preceding example. The polymer recovered is dried and weighed. In this way 36 g. are obtained of solid polyethylene of average molecular weight equal to 34,000 corresponding to a "melt index" of 2.7 and a specific weight of 0.96.

*Example 6*

5 g. of non-porous silica Aerosil of specific surface 200 sq. m. per g. and mean grain diameter 150 A. are impregnated with a solution of chromic anhydride containing 9.3 g. $CrO_3$ per litre. The product obtained is strained and dried. The catalyst then contains 53 g. of $CrO_3$ per kg. It is activated by heating at 1000° C. in the fluidized state in a current of dry air, for 5 to 10 hours. 0.15 g. of the catalyst are introduced into the autoclave, together with 460 g. of cyclohexane. The polymerization takes place exactly as in Example 4. After drying, the polyethylene recovered weighs 230 g. and has an average molecular weight of 22,000, corresponding to a "melt index" of 35.

*Example 7*

PREPARATION OF CATALYST BY MIXING THE CONSTITUENTS IN THE SOLID STATE 25 g. of silica of the non-porous Aerosil type are dried in an oven for 24 hours under vacuum at 110° C. 400–500 ml. of cyclohexane are added to the dry silica and are sufficient to form a very pasty gel. The cyclohexane has been dried by azeotropic distillation and passing over activated alumina. 2.2 g. of $(NH_4)_2 CrO_4$ are incorporated in the gel formed, $(NH_4)_2 CrO_4$ having been ground sufficiently to obtain particles of a mean diameter below 0.18 mm. The mixture is then ground intimately in a mortar for at least 15 minutes, then dried in the oven under vacuum at 110° C. for 10 hours. The catalyst is then a powder used for carrying out the experiments the results of which are given in Table III.

*Example 8*

An experiment on copolymerization of ethylene-butene-1 is conducted in the presence of a catalyst constituted by chromic oxide associated with a non-porous silica Hi-Sil 233. The features and the method of preparation of this catalyst have been described in Example 5. After activation for 15 hours at 600° C., 0.31 g. of catalyst are introduced together with 460 g. of cyclohexane in a 1.5 litre autoclave fitted with a stirrer. The catalyst is maintained in suspension in the solvent by vigorous stirring. The temperature of the reactor is raised to 135° C. and at the same time as the ethylene butene-1 is introduced in a quantity such that the relative concentrations of butene-1 and ethylene in the reaction medium expressed in percent by weight are comprised between 24 of butene-1 to 76 of ethylene and 16 butene-1 to 84 of ethylene. The experiment lasts 30 minutes. Polymerization is stopped by allowing the unpolymerized ethylene and butene-1 to escape. 59 g. of solid copolymer of average molecular weight 28,000 corresponding to a "melt index" of 12 and a specific weight of 0.946, are recovered. A copolymerization experiment comparable in every way and carried out by way of comparison in the presence of a known catalyst described in Example 1, gives a copolymer of average molecular weight 31,500 corresponding to a "melt index" of 4.3 and a specific weight of 0.942.

*Example 9*

A copolymerization experiment is carried out with ethylene and butene-1 in the presence of a catalyst constituted by chromic oxide associated with a non-porous Aerosil silica described in Example 6. After the catalyst has been prepared in the manner described in Example 6, it is activated by heating to 1000° C. in the fluidized state in a current of dry air for 5–10 hours. The copolymer is made in an identical manner to that of Example 8. After 30 minutes a copolymer is recovered with an average molecular weight of 19,500 corresponding to a "melt index" of 49. The reaction rate is 700 g. of copolymer per g. of catalyst per hour.

Example 10

Into a 1.5 litre stainless steel autoclave, perfectly clean and dry, purged thoroughly with nitrogen, there are introduced 700 cm.$^3$ of n-pentane and a mixture of catalysts, constituted of 0.047 g. of chromium oxide associated with a porous silica-alumina support (Davison MS 966 B), previously activated at 540° C., and 0.051 g. of chromium oxide associated with a non-porous Aerosil silica activated at 1000° C. In the same manner as described in Example 1 the ethylene is polymerized according to the "suspension" process at 100° C and. at a pressure of 32 kg./cm.$^2$, for 3 hours. The polyethylene recovered has a molecular weight of 88,000. The reaction rate is 1520 g. polymer per g. of catalyst per hour.

FIGURE 1 shows the comparison of the distribution curve of molecular weights of this polyethylene with the same curves corresponding to polyethylenes produced in the presence of each of the two catalysts of the mixture. Curve 1 represents the cumulative distribution of molecular weight in fractions of polymer obtained with the catalyst prepared by depositing chromium oxide on the Aerosil silica alone, according to this invention. Curve 2 represents the cumulative distribution of molecular weight in fractions of polymer produced with the mixture of two catalysts, i.e. chromium oxide on the Aerosil silica and chromium oxide on porous silica-alumina, according to this invention. Curve 3 is the same type of curve for the polymer produced with the chromium oxide on porous silica-alumina alone. For each of the points on these curves, the ordinate represents the cumulative percentage of the polymer having molecular weights up to and including the molecular weight indicated on the abscissa. Thus in curve 1 the point having an ordinate of 61 percent and an abscissa of 20,000 signifies that 61 weight percent of this total polymer was composed of fractions having molecular weights up to and including 20,000. From these curves it will be evident to those skilled in the art that the effective molecular weight of polymers produced with the nonporous-silica base catalysts was lower than that obtained with the porous silica-alumina gel-base catalysts under the same conditions.

The proportions of the constituents of the composite catalyst have been calculated so that taking into account their respective reactivities, about as much polymer is produced by the one as by the other.

Example 11

In a 1.5 litre autoclave there are added at the same time 460 g. of cyclohexane and a composite catalyst constituted by 0.060 g. of chromium oxide associated with a porous support of silica alumina (Davison MS 966 B) previously activated at 600° C. and 0.130 g. of chromic oxide associated with a non-porous Aerosil silica activated at 1000° C. According to the method described in Example 4, ethylene is polymerized according to the "solution" process at 135° C. and under a pressure of 31.5 kg. per sq. cm. during 2 hours. A polyethylene of molecular weight 29,000 is recovered. The reaction rate is 685 g. of polymer per g. of catalyst per hour.

FIGURE 2 shows the comparison of the distribution curve of molecular weights of polyethylene made in the presence of the mixture of catalysts with the same curves corresponding to polyethylenes obtained in the presence of each of the two catalysts of the mixture. These curves have the same general significance as those in FIGURE 1. Specifically, curve 4 represents the cumulative molecular weight distribution in the polymer obtained by the use of chromium oxide supported on the nonporous Aerosil silica in accordance with this invention. Likewise, curve 5 represents the cumulative molecular weight distribution of the polymer obtained with a mixture of chromium oxide on Aerosil silica and chromium oxide on porous silica-alumina, according to this invention. Curve 6 represents the cumulative molecular weight distribution of the polymer obtained by the use of the chromium oxide on silica-alumina gel alone.

As in the preceding experiment, the proportions of the constitituents of the composite catalyst have been calculated so that taking into account their respective reactivities, about as much polymer is due to the one as to the other.

We claim:

1. A process for polymerizing at least one compound selected from the group consisting of olefins and conjujugated diolefins to normally solid polymer in the presence of a catalyst comprising chromium oxide, at least part of the chromium being hexavalent, said process being characterized in that the catalyst is at least partially composed of chromium oxide associated with a nonporous fine-grain silica.

2. Process according to claim 1, chracterized in that the non-porous silica used is composed of grains having a mean diameter of about 150 A. and possessing a specific surface below 450 sq. m. per g.

3. Process according to claim 1, characterized in that the non-porous silica used is composed of grains of a mean diameter of about 150 A. possessing a specific surface of between 150 and 200 sq. m. per g. and has been prepared by hydrolysis of silicon tetrachloride at high temperature.

4. Process according to claim 1, characterized in that the oxide of chromium associated with the non-porous fine grain silica is activated by heating at a temperature between 250 and 1200° C.

5. Process according to claim 1, characterized in that the non-porous fine grain silica and the oxide of chromium are mixed in the solid state.

6. Process according to claim 1, characterized in that the non-porous fine grain silica is agglomerated into granules which are impregnated with a solution of an oxygen compound of chromium and then ground to obtain smaller particles, said compound being calcinable to chromium oxide.

7. Process of suspension polymerization according to claim 6, characterized in that the size of the polymer particles is controlled by regulating the size of the agglomerated catalyst particles, the polymer particles being larger as the catalyst particles become coarser.

8. Process according to claim 1 characterized in that the olefin feed is principally ethylene and the catalyst is constituted by a mixture of an oxide of chromium associated with a non-porous fine grain silica and an oxide of chromium associated with at least one of the oxides of the group formed by porous silica, alumina, zirconia, thoria and titanium dioxide.

9. Process according to claim 8, characterized in that the catalyst is constituted by a mixture of chromium oxide associated with a non-porous very fine grain silica and chromium oxide associated with a coprecipitated gel of silica and alumina.

10. A catalyst active for the polymerization of olefins to solid polymers and comprising an oxide of chromium supported on nonporous silica having a mean particle diameter of approximately 150 A. and a specific surface area less than 450 square meters per gram, at least part of the chromium being hexavalent.

11. A process for the preparation of an improved polymerization catalyst which process comprises depositing an oxide of chromium on a nonporous silica having a mean particle diameter of approximately 150 A. and a specific surface area less than 450 square meters per gram, and activating the resulting composite by heating at a temperature in the range 500 to 1050° C., to leave at least part of the chromium in the hexavalent state.

References Cited in the file of this patent

UNITED STATES PATENTS 2,825,721     Hogan et al. _____ Mar. 4, 1958